(12) United States Patent
Mayberry et al.

(10) Patent No.: US 7,556,128 B2
(45) Date of Patent: Jul. 7, 2009

(54) DUAL ACTUATOR FRICTION BRAKE ASSEMBLY

(75) Inventors: Richard Wayne Mayberry, Wichita Falls, TX (US); Ian Nigel Hakon, Bedford (GB); Brenton Charles Bluhm, Helenville, WI (US); Richard Carl McConkie, Troy, MI (US)

(73) Assignee: Warner Electric Technology LLC, Braintree, MA (US)

( * ) Notice: Subject to any disclaimer, the term of this patent is extended or adjusted under 35 U.S.C. 154(b) by 166 days.

(21) Appl. No.: 11/263,395

(22) Filed: Oct. 31, 2005

(65) Prior Publication Data

US 2007/0095619 A1 May 3, 2007

(51) Int. Cl.
*F16D 55/36* (2006.01)

(52) U.S. Cl. .................. 188/71.5; 188/71.6; 188/72.1; 188/72.3

(58) Field of Classification Search ............... 188/71.1, 188/170, 71.4, 71.5
See application file for complete search history.

(56) References Cited

U.S. PATENT DOCUMENTS

| 2,835,357 | A | | 5/1958 | Kelley et al. | |
|---|---|---|---|---|---|
| 2,934,177 | A | | 4/1960 | Kelley et al. | |
| 2,955,682 | A | | 10/1960 | Kelley et al. | |
| 3,010,542 | A | | 11/1961 | Graber | |
| 3,053,345 | A | | 9/1962 | Zindler | |
| 3,081,842 | A | | 3/1963 | Zindler et al. | |
| 3,403,755 | A | * | 10/1968 | Barrett et al. | 188/71.5 |
| 3,410,375 | A | | 11/1968 | Schmidt | |
| 3,463,273 | A | | 8/1969 | Morrison | |
| 3,584,708 | A | | 6/1971 | Heck | |
| 3,599,761 | A | * | 8/1971 | Schultz et al. | 188/170 |
| 3,633,714 | A | | 1/1972 | Klaue | |
| 3,814,222 | A | | 6/1974 | Kolvunen | |
| 3,862,678 | A | | 1/1975 | Collins | |
| 3,915,262 | A | | 10/1975 | Klaue | |
| 4,102,438 | A | * | 7/1978 | Rancourt | 188/18 A |
| 4,207,969 | A | * | 6/1980 | Howell | 188/71.6 |
| 4,491,202 | A | | 1/1985 | Schmitt | |
| 4,637,497 | A | | 1/1987 | Hillen | |
| 4,685,541 | A | | 8/1987 | Price et al. | |
| 4,795,003 | A | | 1/1989 | Colgate | |
| 5,330,034 | A | * | 7/1994 | Rancourt et al. | 188/71.6 |
| 5,651,430 | A | * | 7/1997 | Rancourt et al. | 188/1.11 L |
| 5,992,577 | A | * | 11/1999 | Souetre | 188/71.5 |
| 6,006,869 | A | * | 12/1999 | Rancourt et al. | 188/71.5 |
| 6,029,782 | A | * | 2/2000 | Chojecki et al. | 188/170 |
| 6,089,357 | A | * | 7/2000 | Jackson et al. | 188/71.6 |
| 6,241,052 | B1 | * | 6/2001 | Berwanger | 188/71.5 |
| 6,405,837 | B1 | * | 6/2002 | Muramoto | 188/72.5 |
| 2004/0112688 | A1 | * | 6/2004 | Rancourt | 188/71.5 |
| 2007/0095619 | A1 | * | 5/2007 | Mayberry et al. | 188/71.4 |

* cited by examiner

*Primary Examiner*—Robert A Siconolfi
*Assistant Examiner*—James K Hsiao
(74) *Attorney, Agent, or Firm*—Dykema Gossett PLLC

(57) ABSTRACT

An industrial brake is provided through which tension and emergency braking are initiated at opposite axial ends of the brake in order to improve packaging and maintenance of the brake and to enable the addition of an emergency brake function to existing tension brakes without substantial modifications to the brake. The brake includes a housing disposed about a driven shaft and friction plates coupled to the housing and the shaft respectively. One friction plate comprises a liquid cooled fluid jacket. One end cap assembly is disposed at one axial end of the housing and provides a tension brake function. Another end cap assembly is disposed at the opposite axial end of the housing and provides an emergency brake function.

18 Claims, 1 Drawing Sheet

DUAL ACTUATOR FRICTION BRAKE ASSEMBLY

BACKGROUND OF THE INVENTION

1. Field of the Invention

This invention relates to brakes and, more particularly, to a brake in which tension and emergency braking are initiated at opposite axial ends of the brake.

2. Disclosure of Related Art

A conventional water cooled disc brake includes a stationary housing disposed about a rotating shaft. A plurality of friction plates are coupled to the housing and fixed against rotation relative to the housing, but axially moveable relative to the housing. These friction plates define fluid jackets through which cooling liquids are circulated. Another plurality of friction plates are coupled to the shaft for rotation therewith and are axially movable relative to the shaft. The plates coupled to the shaft are interleaved with the plates coupled to the housing. An emergency or safety brake actuator is disposed at one axial end of the brake and applies a constant force in an axial direction to bring the plates into contact with one another. A tension brake actuator is disposed at the same axial end of the brake and applies a variable force for controlled braking torque.

In some conventional brakes, the tension brake actuator applies a force in the opposite axial direction relative to the emergency brake actuator and controlled braking is accomplished by the combination of forces from the two actuators. In these brakes, however, the amount of tension braking force that can be applied and the ability to control the tension braking force are limited because of the need to offset the force of the emergency brake actuator. Commonly assigned U.S. Pat. No. 6,029,782 discloses an improved brake in which an additional actuator is employed to counter the force applied by the emergency brake actuator. In this manner, tension braking is made responsive solely to the tension brake actuator. Although the brake in U.S. Pat. No. 6,029,782 represents an improvement relative to previous brake designs, the improved brake suffers from packaging limitations and renders maintenance of the brake actuators and other brake components relatively difficult. Further, the brake design cannot be readily applied to modify existing brakes having only a tension brake actuator. Rather, substantial modifications to the brake are required.

The inventors herein have recognized a need for a brake that will minimize and/or eliminate one or more of the above-identified deficiencies.

SUMMARY OF THE INVENTION

The present invention provides a brake having emergency and tension brake actuators disposed at opposite axial ends of the brake.

A brake in accordance with the present invention includes a housing disposed about a driven shaft. The driven shaft rotates about a rotational axis. The brake further includes a first friction plate coupled to the driven shaft for rotation therewith and axially movable relative to the shaft. The brake also includes a second friction plate coupled to the housing and fixed against rotation relative to the housing, but axially movable relative to the housing. The second friction plate defines a fluid jacket configured for passage of a fluid. The brake further includes a first end cap assembly disposed at a first axial end of the housing and coupled to the housing. The first end cap assembly includes a first pressure plate and means for applying a variable control force to the first pressure plate to urge the first pressure plate in a first axial direction towards the first and second friction plate. The brake further includes a second end cap assembly disposed at a second axial end of the housing. The second end cap assembly is coupled to the housing and includes a second pressure plate. The second cap assembly also includes means for applying a setting force to the second pressure plate in a second axial direction to urge the second pressure plate towards the first and second friction plates and means for selectively applying a release force in the first axial direction against the setting force.

A brake in accordance with the present invention has significant advantages relative to conventional brakes. First, packaging of the brake is improved by locating the tension and emergency brake actuators at opposite axial ends of the brake. Second, accessibility for maintenance is improved. Finally, existing brakes employing only tension brakes can be easily modified to incorporate emergency brake functions.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
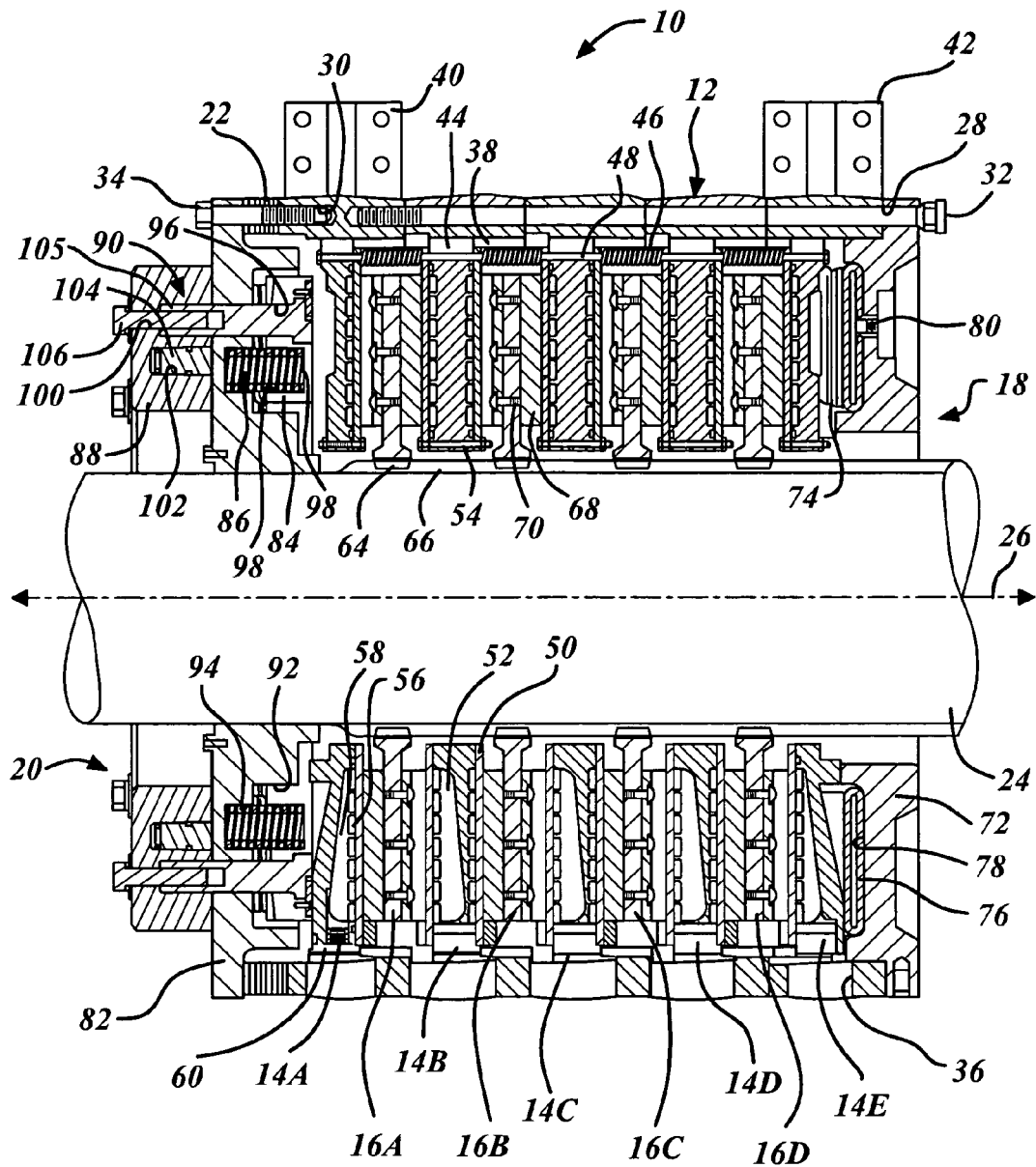
FIG. 1 is a split cross-sectional view of a brake in accordance with the present invention.

Referring now to the drawings wherein like reference numerals are used to identify identical components in the various views, FIG. 1 illustrates a brake 10 in accordance with the present invention. Brake 10 may be provided for heavy duty industrial use (e.g., on oil drilling equipment). Brake 10 includes a housing 12, two sets of friction plates 14A-E, 16A-D, and end cap assemblies 18, 20. Brake 10 may also include a spacer 22.

Housing 12 provides structural support to the other components of brake 10. Housing 12 may be made from conventional metals, metal alloys and/or plastics. Housing 12 is disposed about a driven shaft 24 and may be centered about the rotational axis 26 of the shaft 24. Housing 12 may be substantially circular in shape and unitary in construction or composed of multiple pieces joined together. Housing 12 defines axially extending bores 28, 30 at either end configured to receive fasteners 32, 34 used to connect end cap assemblies 18, 20, respectively, to housing 12. Housing 12 also defines a plurality of radial openings 36 sized for receipt of hoses and connectors (not shown). Housing 12 includes a plurality of spline teeth 38 on a radially inner surface for a purpose described hereinbelow. One or more mounting brackets 40, 42 or feet, may extend from housing 12 to allow brake 10 to be mounted to a surface extending substantially parallel to axis 26.

Friction plates 14A-E are provided to transmit a braking torque to friction plates 16A-D and to shaft 24 upon engagement of plates 14A-E, 16A-D. Friction plates 14A-E may include a plurality of spline teeth 44 disposed on radially outer surfaces of plates 14A-E that are configured to mate with teeth 38 of housing 12 thereby preventing relative rotation of plates 14A-E relative to housing 12, but allowing axial movement of plates 14A-E relative to housing 12. Friction plates 14A-E may be biased apart by springs 46 that are disposed between each pair of plates 14A-E and are disposed about pins 48 extending through plates 14A-E. Although five friction plates 14A-E are shown in the illustrated embodiment, it should be understood that the number of friction plates can be varied to vary braking torque. Each of friction plates 14A-E includes one or more plates 50 and a fluid jacket 52.

Plates 50 are conventional in the art and may be made from a variety of conventional metals and metal alloys including iron or copper. Plates 50 may be connected to one or both sides of each fluid jacket 52 using fasteners 54 such as bolts or screws or pins.

Fluid jackets 52 are provided to allow for circulation of a cooling liquid such as water or another conventional liquid within brake 10 to allow for transfer of frictional heat generated within brake 10. Jackets 52 are conventional in the art and include an annular body that defines a fluid manifold through which liquid circulates and which provides a surface on which plates 50 are mounted. Jackets 52 may define a plurality of concentric flow passages 56 and radial flow passages 58 that place concentric passages 56 in fluid communication with fluid inlets 60 and outlets (not shown).

Friction plates 16A-D are provided to transfer braking torque from friction plates 14A-E to shaft 24. Friction plates 16A-D may be made from conventional metals and metal alloys such as iron and copper. Plates 16A-D include a plurality of spline teeth 64 at a radially inner surface that are configured to engage with teeth 66 of shaft 24 (or a hub mounted to shaft 24) to couple friction plates 16A-D to shaft 24. Plates 16A-D may include a conventional friction material 68 connected to each side of plate 16A-D by fasteners 70 such as bolts or screws. Again, although four plates 16A-D are shown in the illustrated embodiment, it should be understood that the number of plates 16 can be varied to vary braking torque.

End cap assembly 18 closes one axial end of housing 12 and provides support for a tension brake actuator. End cap assembly 18 includes an end plate 72, a pressure plate 74, and means, such as bladder 76, for applying a variable control force to pressure plate 74 to urge pressure plate 74 in an axial direction (to the left in FIG. 1) towards friction plates 14A-E, 16A-D.

End plate 72 is annular in construction and is fastened to housing 12 using one or more fasteners 32. Plate 72 defines an annular recess 78 configured to receive bladder 76. Plate 72 also defines an axial bore 80 through which pneumatic or hydraulic fluid is provided to bladder 76 via a hose (not shown).

Plate 74 is provided to compress plates 14A-E, 16A-D to create a braking torque on shaft 24. Plate 74 is conventional in the art and may be made from conventional metals and metal alloys. Plate 74 is annular in construction.

Bladder 76 provides a means for applying a variable control force to plate 74 and serves as a tension brake actuator. Bladder 76 is conventional in the art. When fluid is supplied to bladder 76, bladder 76 expands and urges pressure plate 74 in an axial direction (to the left in FIG. 1) against the force of springs 46 to compress, and cause engagement of, friction plates 14A-E, 16A-D. When fluid pressure is removed from bladder 76, springs 46 bias friction plates 14A-E, 16A-D apart.

End cap assembly 20 closes an opposite axial end of housing 12 and provides support for a safety or emergency brake actuator. End cap assembly 20 includes an end plate 82, a pressure plate 84, means, such as springs 86, for applying a setting force to pressure plate 84 in an axial direction (to the right in FIG. 1) to urge pressure plate 84 towards friction plates 14A-E, 16A-D, and means, such as piston 88 and one or more fasteners 90, for selectively applying a release force in an opposite axial direction (to the left in FIG. 1) against the setting force.

End plate 82 is annular in construction and is fastened to housing 12 using one or more fasteners 34. Plate 82 defines an annular recess 92 configured to receive plate 84. Plate 82 further defines a plurality of recesses 94 opening into recess 92. Each recess 94 is configured to receive one end of a spring 86.

Pressure plate 84 is provided to compress plates 14A-E, 16A-D to create a braking torque on shaft 12. Plate 84 is conventional in the art and may be made from conventional metals and metal alloys. Plate 84 is annular in construction and defines one or more stepped diameter bores 96 configured to receive corresponding fasteners 90. Plate 84 may also define one or more recesses 98 on a side of plate 84 opposite friction plates 14A-E, 16A-D. Each recess 98 is configured to receive one end of a corresponding spring 86.

Springs 86 provide a means for applying a setting force against pressure plate 84 to urge plate 84 in an axial direction (to the right in FIG. 1) to compress plates 14A-E, 16A-D. Springs 86 are disposed within recesses 94, 98 in end plate 82 and pressure plate 84, respectively. Springs 86 are conventional in the art any may comprise coil springs or other conventional springs. Springs 86 may be circumferentially spaced about axis 26 and may be disposed at varying radial distances from axis 26.

Piston 88 selectively urges fasteners 90 and plate 84 in an axial direction (to the left in FIG. 1) against the setting force of springs 86. Although a single, annular piston 88 is shown in the illustrated embodiment, multiple pistons 88 could be employed. Piston 88 is disposed on one side of end plate 82 opposite pressure plate 84. Piston 88 defines one more through bores 100 through which fasteners 90 extend. Piston 88 also defines one or more fluid chambers 102 opening in the direction of end plate 82. A body 104 (or bodies) may be disposed in the fluid chamber 102 (or chambers 102), bearing against end plate 82. A seal (not shown) disposed between body 104 and the walls of chamber 102 prevents fluid leakage.

Fasteners 90 couple pressure plate 84 and piston 88 for movement together. Fasteners 90 may extend through pressure plate 84, end plate 82 and piston 88 and may include a female part 105 and a male part 106. In the illustrated embodiment, each female part 105 has a stepped diameter at one end configured to be received within bores 96 in pressure plate 84. Male part 106 extends into female part 105 and is secured for movement with female part 105. Male part 106 includes a head that bears against the outer surface of piston 88.

Brake 10 is released by providing fluid to chambers 102. The expanding fluid volume within chambers 192 causes piston 88 to move away from end plate 82 in an axial direction (to the left in FIG. 1) against the force of springs 86. Piston 88 pulls fasteners 90 and pressure plate 84 in the same direction. When fluid pressure is removed from chambers 102, springs 86 force pressure plate 84 in the opposite axial direction (to the right in FIG. 1) to reset the brake 10, returning piston 88 to its original position.

Spacer 22 provides means for adjusting an axial position of end cap assembly 20 relative to housing 12. Although spacer 22 is illustrated in FIG. 1 for use in adjusting the axial position of end cap assembly 20 relative to housing 12, it should be understood that spacer 22 could be employed on the opposite side of brake 10 to allow adjustment of the axial position of end cap assembly 18 relative to housing 12. Spacer 22 may comprise one or more shims disposed between end cap assembly 20 and housing 12. The shims may be disposed about the circumference, or a portion of the circumference, of fasteners 34. As the brake wears, fasteners 34 may be loosened to allow removal of one or more shims thereby enabling end cap assembly 20 to be drawn closer to housing 12 and to compensate for wear.

A brake in accordance with the present invention has significant advantages relative to conventional brakes. First, packaging of the brake is improved by locating the tension and emergency brake actuators at opposite axial ends of the brake. Second, accessibility for maintenance is improved. Finally, existing brakes employing only tension brakes can be easily modified to incorporate emergency brake functions.

While the invention has been shown and described with reference to one or more particular embodiments thereof, it will be understood by those of skill in the art that various changes and modifications can be made without departing from the spirit and scope of the invention.

We claim:

1. A brake, comprising:
   a housing disposed about a driven shaft, said driven shaft rotating about a rotational axis;
   a first friction plate coupled to said driven shaft for rotation therewith and axially movable relative to said driven shaft;
   a second friction plate coupled to said housing and fixed against rotation relative to said housing, but axially movable relative to said housing, said second friction plate defining a fluid jacket configured for passage of a fluid;
   a first end cap assembly disposed at a first axial end of said housing and coupled to said housing; said first end cap assembly including
     a first pressure plate; and,
     means for applying a variable control force to said first pressure plate to urge said first pressure plate in a first axial direction towards said first and second friction plates;
   a second end cap assembly disposed at a second axial end of said housing and coupled to said housing, said second end cap assembly including:
     a second pressure plate;
     means for applying a setting force to said second pressure plate in a second axial direction to urge said second pressure plate towards said first and second friction plates; and,
     means for selectively applying a release force in said first axial direction against said setting force
   wherein said means for applying a variable control force and said means for applying a setting force are separately controllable
   wherein said means for applying a release force includes:
   a piston disposed on an opposite side of an end plate of said second end cap assembly relative to said second pressure plate, said piston defining a fluid chamber;
   a fastener extending through said end plate and coupling said piston and said second pressure plate;
   wherein fluid pressure provided to said fluid chamber causes movement of said piston in said second axial direction and corresponding movement of said fastener and said second pressure plate.

2. A brake, comprising:
   a housing disposed about a driven shaft, said driven shaft rotating about a rotational axis;
   a first friction plate coupled to said driven shaft for rotation therewith and axially movable relative to said driven shaft;
   a second friction plate coupled to said housing and fixed against rotation relative to said housing, but axially movable relative to said housing, said second friction plate defining a fluid jacket configured for passage of a fluid;
   a first end cap assembly disposed at a first axial end of said housing and coupled to said housing; said first end cap assembly including
     a first pressure plate; and,
     means for applying a variable control force to said first pressure plate to urge said first pressure plate in a first axial direction towards said first and second friction plates;
   a second end cap assembly disposed at a second axial end of said housing and coupled to said housing, said second end cap assembly including:
     a second pressure plate;
     means for applying a setting force to said second pressure plate in a second axial direction to urge said second pressure plate towards said first and second friction plates; and,
     means for selectively applying a release force in said first axial direction against said setting force
   wherein said means for applying a variable control force and said means for applying a setting force are separately controllable
   further comprising a spacer disposed between said housing and one of said first and second end cap assemblies.

3. The brake of claim 2, further comprising a mounting bracket extending radially from said housing.

4. The brake of claim 2 wherein said means for applying a variable control force includes an expandable fluid bladder.

5. The brake of claim 4 wherein said bladder is disposed against said pressure plate.

6. The brake of claim 2 wherein said setting means includes a plurality of springs.

7. The brake of claim 6 wherein said springs are circumferentially spaced.

8. The brake of claim 2 wherein said spacer comprises a plurality of shims.

9. The brake of claim 2 wherein said spacer is disposed about a fastener coupling said one end cap assembly to said housing.

10. A brake, comprising:
   a housing disposed about a driven shaft, said driven shaft rotating about a rotational axis;
   a first friction plate coupled to said driven shaft for rotation therewith and axially movable relative to said driven shaft;
   a second friction plate coupled to said housing and fixed against rotation relative to said housing, but axially movable relative to said housing, said second friction plate defining a fluid jacket configured for passage of a fluid;
   a first end cap assembly disposed at a first axial end of said housing and coupled to said housing; said first end cap assembly including
     a first pressure plate; and,
     an expandable fluid bladder, said bladder configured to selectively urge said first pressure plate in a first axial direction towards said first and second friction plates;
   a second end cap assembly disposed at a second axial end of said housing and coupled to said housing, said second end cap assembly including:
     an end plate fixed to said housing
     a second pressure plate disposed between said end plate and said first and second friction plates;
     a first spring disposed between said end plate and said second pressure plate and biasing said second pressure plate in a second axial direction to urge said second pressure plate towards said first and second friction plates;

a piston disposed on an opposite side of said end plate relative to said second pressure plate, said piston defining a fluid chamber;

a fastener extending through said end plate and coupling said piston and said second pressure plate;

wherein fluid pressure provided to said fluid chamber causes movement of said piston in said second axial direction and corresponding movement of said fastener and said second pressure plate.

11. The brake of claim 10, further comprising a mounting bracket extending radially from said housing.

12. The brake of claim 10 wherein said bladder is disposed against said pressure plate.

13. The brake of claim 10, further comprising a second spring disposed between said end plate and said second pressure plate and biasing said second pressure plate in said second axial direction to urge said second pressure plate towards said first and second friction plates.

14. The brake of claim 13 wherein said first and second springs are circumferentially spaced.

15. The brake of claim 10, further comprising a spacer disposed between said housing and one of said first and second end cap assemblies.

16. The brake of claim 15 wherein said spacer comprises a plurality of shims.

17. The brake of claim 15 wherein said spacer is disposed about a fastener coupling said one end cap assembly to said housing.

18. The brake of claim 2 wherein said fluid flows within and through said second friction plate.

* * * * *